Patented Apr. 8, 1952

2,592,332

UNITED STATES PATENT OFFICE 2,592,332

PROCESSES FOR PREPARING CONCENTRATED BANANA PRODUCTS

Lucio Reale, New York, N. Y.

No Drawing. Application May 6, 1950,
Serial No. 160,579

5 Claims. (Cl. 99—204)

The present invention relates to a process for preparing and preserving extracts and like products of fruits in general, especially of pulpy fruits such as bananas, and includes the products thus prepared, as well.

The main object of my invention is to contribute to the art of producing and preserving special fruit products such as extracts and preserves thereof, and thus especially of bananas, plantains and such pulp fruits as new products heretofore not obtainable on the market.

Another object of my invention is to produce such novel fruit extracts and preserve products of fruits in at least a semi-fluid form which are normally considered too perishable to attempt preserving, that this process will make such perishable fruits hereafter constantly available in preserved form at all times everywhere.

A further object of my invention is to incorporate in such novel fruit preserves and extracts, various nutrients and preservative means such as suitable acids and saline substances, as well as sugar which serve in addition to improve the vitamin content, nutritive value, flavor, digestibility and assimilability of these preserves, extracts and fruit products.

It is likewise an object of this invention to prepare a refined extract or preserve of bananas in instantly available nutritious and palatable form for use in all climes and seasons so as to benefit trade and provide more widespread nutrition throughout the world.

In fine, it is an overall object of the present invention to initially ripen bananas at a temperature of about 25° C., after which they are peeled in conventional manner, cleaned exteriorly, split lengthwise, and freed from the seed carrying portions of the central core; the cleaned halves being then pulped and boiled for a given time to form a semi-fluid mass which is then pressure-filtered, after which small amounts of preservatives such as salicylic acid, boric acid, sodium chloride with a larger amount of sugar are added, following which the resulting mass is either exposed in molds to dry heat to form a solid product, or concentrated to a desired consistency by treatment in heat in vacuo to form a more or less syrupy or jelly-like extract or preserve.

Other objects and advantages of my invention will be disclosed in greater detail as the specification proceeds.

In order to facilitate ready comprehension of the invention for a proper appreciation of the salient features thereof, the invention will be explained hereinafter together with specific procedures and steps as well as means and definite adjuncts in predetermined amounts together with apparatus used for obtaining the final products.

It is, of course, a matter of common knowledge that the banana in its different varieties is one of the richest of all foods with respect to vitamins, proteins, and natural sugar in readily assimilable form. Despite this fact, this fruit has hitherto been marketed and almost exclusively consumed in natural condition, and only at or near its place of cultivation or the places to which it may be quickly transported. The reason for such limitation of the use of this most excellent fruit with respect to time and place is obviously because the banana when ripe and in edible condition is extremely perishable, and in fact, in its ripe state is almost immediately subject to beginning deterioration by an early commencement of an unavoidable gradual process of decomposition which is scarcely subject to control by any ordinary means.

Upon considering this problem, it has occurred to me that if bananas were treated in some effective manner to obtain an extract or a preserve therefrom without injuring the vitamin and nutritive content nor the palatability thereof, this would make the fruit available on all markets in all seasons. If the vitamin and nutritive contents as well as the digestibility and assimilability could also be increased at the same time, it would seem that an exceptionally valuable product should thereby be added to the nutrition of the world at large. As a result of such consideration and exhaustive experiments and tests, I have succeeded in perfecting a process and resulting product that serve admirably for the present purpose, as will now be more fully set forth.

Hence, with the foregoing objects in view, in the practice of my invention the bananas which are selected for treatment according to the present process are first carefully placed in storage for ripening, while maintaining the temperature constant at about 25° C., until an exact ripe condition has been attained. At this point, which is important for the instant purpose in order to ensure perfect quality in the preserved fruit or extract, the condition of the fruit is closely watched with extreme care to avoid the development, as far as possible, of any over-ripe portions. Such portions are to be strictly avoided, as their presence with, or in, normally ripe fruit has a deleterious effect on the final product, despite an otherwise close adherence to an approved sequence of steps for treating the fruit.

On the other hand, in view of the fact that bananas have an acid reaction, it is, of course, necessary to avoid bringing this fruit into contact with active metals, because the latter become oxidized thereby and the fruit contaminated. Therefore the equipment, vessels, utensils and cutlery must be selected to be made either of inert metal, or active metal chromium plated, or even to be made of glass, enamelware, or the like.

Assuming that the fruit is ripe for use in making extract, or preserve according to the invention, each banana is first peeled in well-known manner and then externally cleaned with removal of the strings frequently clinging thereto, after which it is longitudinally split to cleave and expose the seed-bearing core. The latter with its fibrous matter and numerous small seeds is carefully gouged out and any over-ripe portions also removed to prepare the banana halves for pulping. Then the fruit thus initially prepared and split is mashed into pulp by any known means and reduced to a fine state of division.

The fruit pulp thus obtained is introduced into a suitable kettle and boiled for a period of time ranging from 45 minutes, minimum to a maximum of 90 minutes, which is conducive to production of the best possible results. Cooking for less than 45 minutes will not remove a sufficient amount of moisture from the pulp, whereas cooking beyond 90 minutes will produce a premature solidification of the mass caused by initial sugaring therein. Such effects must, of course, be avoided as they would seriously interfere with subsequent operations and treatment for arriving at the desired end products.

Upon completing this initial cooking operation, the cooked banana pulp which has thereby been reduced to a semi-fluid condition, is subjected to filtration, preferably under pressure by more or less known means in order to refine and thereby purify the product by final removal of any fibrous residues.

The semi-fluid mass refined in this manner is then augmented by cautiously adding thereto various specified substances for the purpose of improving the vitamin content, nutritional value, flavor and last, but not least, also the digestibility and assimilability of this fruit extract or product. The additions are likewise intended to preserve the fruit extract indefinitely in perfect condition against deterioration in any degree.

The substances indicated as useful for this purpose include sugar and other sugaring materials, salicylic acid, boric acid ($H_3BO_3$) and sodium chloride (NaCl). Naturally, only the sugar is added in any considerable amount, the other substances forming virtually only heavy traces in the mass.

For example, a typical formula for treating a given quantity of the semi-liquid banana extract or preserve when duly cooked, filtered and refined as already outlined, is as follows:

To 100 parts by weight of the refined banana extract of mass are added:

About 30 parts by weight of sugar
About 0.3 part by weight of salicylic acid
About 0.1 part by weight of boric acid, and
About 0.4 part by weight of sodium chloride.

These substances are stirred into the soft semi-fluid mass and are soon dissolved so as to uniformly permeate the entire mass. However, the proportions of the indicated substances need not be arbitrarily fixed at the figures just given, but may be varied to suit different varieties of bananas intended to be treated and preserved. In fact, the process above described is applicable to all varieties of bananas and even the substances used may be varied qualitatively, if desired.

The fruit preserve or extract product thus far described may be further treated to condense and even practically solidify the same. Thus, the semi-fluid mass may be introduced into a suitable concentrator and condensed and concentrated by the action of heat in vacuo, and the resulting concentrate put into package containers of glass, paraffined paper board, or paraffined wood or the like for indefinite preservation and for the market. Should a further concentration and more condensation be desired, the refined mass is introduced into molds and exposed to drying heat in an oven or dryer operating with hot air circulation, and when the extract or banana preserve is solidified, the same may be packaged for storage, future use or sale.

The extracted refined banana pulp, including the added substances mixed therewith can thus be introduced into glass jars and subjected to a sterilizing step and sealed in the jars to preserve the treated pulp contents therein. In this manner, the natural flavor will be retained in the refined banana pulp even in its semi-fluid condition, not to mention that the process will be found to be more economical than the conventional processes for preserving fruit.

The preserved product of the banana resulting from the foregoing procedure retains substantially all of the original high food value of the banana by virtue of its wealth of vitamin and protein content, and in addition is more digestible than fresh fruit, due to the addition of the sugar and salts. Thus the present product is particularly suitable for feeding infants and invalids.

While the invention has mainly been described as applied to the production of banana extract and preserves, for which it is admittedly ideal, yet the same invention may be used for preparing extracts and preserves of other fruits as well. Hence the invention is therefore not to be considered as limited to the production of banana products in the exact manner set forth, but may be varied to suit different conditions and may serve to prepare extracts and preserves of other fruits in modified manner.

Manifestly, variations may thus be resorted to and steps and features may be modified or used without others within the scope of the appended claims.

Having now fully described my invention, I claim:

1. The process for preparing banana extracts and preserves, which consists in first storing bananas in an atmosphere of about 25° C. until ripe; maintaining watch over the bananas until exactly ripe; removing the peel from the ripe bananas; externally cleaning the peeled bananas to remove strings and adhering peel particles; splitting the bananas lengthwise and removing the halves of the seed-bearing core from said halves; mashing the cleaned and cored split bananas to reduce them to pulp; cooking the mashed banana pulp for a period of time ranging from 45 to 90 minutes; filtering the cooked banana pulp under pressure to remove fibrous material; mixing sugary and saline substances with the cooked filtered banana pulp; concentrating the mixed filtered and cooked banana pulp to a predetermined consistency by exposing the same to heat in vacuo; and drying the thus obtained concentrated product by exposing it to hot air.

2. The process for preparing banana extracts and preserves, which consists in removing the peel from ripe bananas; externally cleaning the peeled bananas to remove strings and adhering peel particles; splitting the bananas lengthwise and removing the halves of the seed-bearing core from said halves; mashing the cleaned and cored split bananas to reduce them to pulp; cooking the mashed banana pulp for a period of time ranging from 45 to 90 minutes; filtering the cooked banana pulp to remove fibrous material; adding a limited amount of sugar and smaller amounts of salicylic acid, boric acid, and common table salt to the filtered and cooked banana pulp; and concentrating the mixed cooked and filtered banana pulp to a thickened consistency by exposing the same to heat in vacuo.

3. The process for preparing banana extracts and preserves, which consists in removing the peel from ripe bananas; externally cleaning the peeled bananas to remove strings and adhering peel particles; splitting the bananas lengthwise and removing the halves of the seed-bearing core from said halves; mashing the cleaned and cored split bananas to reduce them to pulp; cooking the mashed banana pulp for a period of time ranging from 45 to 90 minutes; filtering the cooked banana pulp to remove fibrous material; adding to 100 parts by weight of the cooked and filtered banana pulp, 30 parts by weight of sugar, .3 part by weight of salicylic acid, .1 part by weight of boric acid ($H_3BO_3$), and .4 part by weight of sodium chloride; and concentrating the mixed cooked and filtered banana pulp to a thickened consistency by exposing the same to heat in vacuo.

4. The process for preparing banana extracts and preserves, which consists in first storing bananas in an atmosphere of about 25° C. until ripe; maintaining watch over the bananas until exactly ripe; removing the peel from the ripe bananas; externally cleaning the peeled bananas to remove strings and adhering peel particles; splitting the bananas lengthwise and removing the halves of the seed-bearing core from said halves; mashing the cleaned and cored split bananas to reduce them to pulp; cooking the mashed banana pulp for a period of time ranging from a minimum of 45 minutes to a maximum of 90 minutes; filtering the cooked banana pulp under pressure to remove fibrous material; adding to 100 parts by weight of the cooked and filtered banana pulp, 30 parts by weight of sugar, .3 part by weight of salicylic acid, .1 part by weight of boric acid ($H_3BO_3$), and .4 part by weight of sodium chloride; and concentrating the mixed cooked and filtered banana pulp to a thickened consistency by exposing the same to heat in vacuo.

5. The process for preparing banana extracts and preserves, which consists in first storing bananas until ripe; removing the peel from the ripe bananas; externally cleaning the peeled bananas to remove strings and adhering peel particles; splitting the bananas lengthwise and removing the halves of the seed-bearing core from said halves; mashing the cleaned and cored split bananas to reduce them to pulp; cooking the mashed banana pulp; filtering the cooked banana pulp under pressure to remove fibrous material; mixing sugary and saline substances with the cooked filtered banana pulp; concentrating the mixed filtered and cooked banana pulp to a predetermined consistency by exposing the same to heat in vacuo; and drying the thus obtained concentrated product by exposing it to hot air.

LUCIO REALE.

REFERENCES CITED

The following references are of record in the file of this patent:

UNITED STATES PATENTS

| Number | Name | Date |
| --- | --- | --- |
| 1,138,887 | Plunkett | May 11, 1915 |
| 2,118,391 | Caballero | May 24, 1938 |
| 2,435,842 | Northentt et al. | Feb. 10, 1948 |
| 2,472,289 | Ermert | June 7, 1949 |
| 2,507,564 | Foote | May 16, 1950 |

OTHER REFERENCES

Scientific Preservation of Foods by Rector, 1925, pages 158, 160, 140, 141, 139.